United States Patent
Li et al.

(10) Patent No.: US 7,460,298 B2
(45) Date of Patent: Dec. 2, 2008

(54) INTEGRATED OPTICAL DUAL AMPLIFIER

(75) Inventors: Jinghui Li, San Jose, CA (US); Genzao Zhang, Ottawa (CA); Tongqing Wang, Los Altos, CA (US); Tiangong Liu, Mountain View, CA (US)

(73) Assignee: Oplink Communications, Inc., San Jose, CA (US)

( * ) Notice: Subject to any disclaimer, the term of this patent is extended or adjusted under 35 U.S.C. 154(b) by 294 days.

(21) Appl. No.: 10/354,064

(22) Filed: Jan. 30, 2003

(65) Prior Publication Data

US 2004/0212875 A1 Oct. 28, 2004

Related U.S. Application Data

(60) Provisional application No. 60/352,257, filed on Jan. 30, 2002.

(51) Int. Cl.
H04B 10/17 (2006.01)
H04B 10/12 (2006.01)

(52) U.S. Cl. ............... 359/341.32; 359/333; 359/337.4; 385/14; 385/129; 385/130; 385/131

(58) Field of Classification Search ............ 359/333, 359/341.32, 341.41, 337.4; 385/14, 129, 385/131, 130
See application file for complete search history.

(56) References Cited

U.S. PATENT DOCUMENTS

| | | | | |
|---|---|---|---|---|
| 5,050,949 A | * | 9/1991 | DiGiovanni et al. | 359/337.4 |
| 5,343,320 A | * | 8/1994 | Anderson | 398/157 |
| 5,526,371 A | * | 6/1996 | Shmulovich et al. | 372/68 |
| 5,555,127 A | * | 9/1996 | Abdelkader et al. | 359/341.1 |
| 5,555,477 A | * | 9/1996 | Tomooka et al. | 398/164 |
| 5,721,637 A | * | 2/1998 | Simon et al. | 359/344 |
| 5,745,274 A | * | 4/1998 | Fatehi et al. | 398/198 |
| 5,778,132 A | * | 7/1998 | Csipkes et al. | 385/135 |
| 5,801,878 A | * | 9/1998 | Bourret et al. | 359/341.33 |
| 5,978,130 A | * | 11/1999 | Fee et al. | 359/341.32 |
| 5,991,069 A | * | 11/1999 | Jander | 359/337 |
| 6,049,418 A | * | 4/2000 | Srivastava et al. | 359/337.4 |
| 6,188,510 B1 | * | 2/2001 | Edagawa et al. | 359/341.33 |
| 6,236,499 B1 | * | 5/2001 | Berg et al. | 359/341.2 |
| 6,335,823 B2 | * | 1/2002 | Ohshima et al. | 359/341.32 |
| 6,359,725 B1 | * | 3/2002 | Islam | 359/334 |
| 6,414,788 B1 | * | 7/2002 | Ye et al. | 359/341.41 |
| 6,426,833 B1 | * | 7/2002 | Bao | 359/341.32 |
| 6,437,906 B1 | * | 8/2002 | Di Pasquale et al. | 359/337.2 |
| 6,580,552 B2 | * | 6/2003 | Welch | 359/341.32 |
| 6,583,925 B1 | * | 6/2003 | Delavaux et al. | 359/341.32 |
| 6,611,371 B2 | * | 8/2003 | Wigley et al. | 359/337.2 |
| 6,657,774 B1 | * | 12/2003 | Evans et al. | 359/341.32 |
| 6,917,731 B2 | * | 7/2005 | Bennett et al. | 385/15 |
| 2002/0171917 A1 | * | 11/2002 | Lelic et al. | 359/341.4 |
| 2004/0001715 A1 | * | 1/2004 | Katagiri et al. | 398/81 |

* cited by examiner

Primary Examiner—Eric Bolda
(74) Attorney, Agent, or Firm—Fish & Richardson P.C.

(57) ABSTRACT

An apparatus is provided comprising a dual optical amplifier. The two optical amplifiers are integrated, in that they share at a set of optical, electrical, or opto-electrical components. The two optical amplifiers may share a pump laser. Alternatively, the optical amplifiers may share photo-detectors. Methods of controlling the signal strength of output signals are also provided. A chip-based integrated optical dual amplifier, using Erbium-Doped Waveguides, is also provided.

10 Claims, 10 Drawing Sheets

INTEGRATED OPTICAL DUAL AMPLIFIER

CROSS-REFERENCE TO OTHER APPLICATION

This application claims priority from provisional U.S. Patent Application No. 60/352,257 filed Jan. 30, 2002.

FIELD OF THE INVENTION

This invention relates to optical communications, and more particularly to optical amplifiers.

BACKGROUND OF THE INVENTION

In optical communication systems, optical amplifiers are used to improve the power level of optical signals. At the transmitter side of the communication system, a booster is used to amplify the optical signal power before the signal is launched into the optical fiber. At the receiver side, a pre-amplifier is used to amplify the received signal power to a sufficient level for the receiver sensitivity. The boosters and pre-amplifiers also compensate for component: losses added as optical communication systems become more sophisticated, such as dispersion compensation modules.

In a multi-channel communication system, such as systems that employ wavelength division multiplexing (WDM), a single booster and a single pre-amplifier may be used for all channels. However, as the number of channels being used increases, it becomes more difficult for a single multi-channel booster to achieve the required output power for all channels. Furthermore, as the data rate of optical communication systems increases, the required receiver power for each receiver increases. A single multi-channel pre-amplifier may have difficulty achieving the required receiver power for the receivers for all channels.

There is therefore a trend towards using a single booster and a single pre-amplifier for each channel. For each transmitter, one booster is placed between the transmitter and the multiplexer. In this way, each booster amplifies the signal strength of only one channel. For each receiver, one pre-amplifier is placed between the demultiplexer and the receiver. A single-channel tuneable dispersion compensation module/polarization mode dispersion compensator may be placed between each pre-amplifier and the corresponding receiver.

The use of single-channel boosters and single-channel pre-amplifiers allows the required signal strengths to be obtained, even at higher communication speeds (such as 40 Gbps). However the use of multiple single-channel boosters and single-channel pre-amplifiers can be costly. The greater number of components required in using many boosters and pre-amplifiers can be expensive, in terms of both cost and power consumption.

SUMMARY OF THE INVENTION

The present invention provides an integrated optical dual amplifier (IODA). The IODA includes a first optical amplifier having a first set of components and a shared set of components, and a second optical amplifier having a second set of components and the shared set of components. In one embodiment, the shared components include a pump laser and a coupler coupling the pump laser to each of the optical amplifiers. One of the optical amplifiers may include a variable optical attenuator (VOA), by which a control circuit can adjust the signal strength of the corresponding output signal to a desired level. Alternatively, the control circuit may also adjust the output power of the pump laser, thereby adjusting the signal strength of the output signals of both optical amplifiers to a corresponding desired level.

In another embodiment, the shared set of components include a pump laser and a coupler, and further include a pump isolator. Remaining pump power from the first optical amplifier is re-used in the second optical amplifier.

In yet another embodiment, the shared set of components includes a pump laser and a variable coupling ratio coupler coupling the pump laser to each of the first optical amplifier and the second optical amplifier. A control circuit monitors the signal strength of the output signals by means of photodetectors, and adjusts the output power of the pump laser and the coupling ratio of the variable coupling ratio coupler until each of the signal strengths is at a corresponding desired level.

In yet another embodiment, the shared set of components includes a first photodetector, a first coupler coupling the first photodetector to the first optical amplifier and to the second optical amplifier, a second photodetector, and a second coupler coupling the second photodetector to the first optical amplifier and to the second optical amplifier. If a first dither is included in the input signal to the first optical amplifier, and a different second dither (having a different frequency or code than that of the first dither) is included in the input signal to the second optical amplifier, then a control circuit can monitor the signal strengths of the output signals of each of the optical amplifiers. The control circuit can then adjust the output power of each optical amplifier's pump laser until the signal strengths of the output signals are at respective desired levels.

The present invention also provides an IODA in which the first optical amplifier is a pre-amplifier within a reception module of an optical communication system and the second optical amplifier is a booster within a transmission module of the optical Communication system.

The present invention also provides a two-stage amplifier including a first optical amplifier having a first set of components and a shared set of components, and a second optical amplifier having a second set of components and the shared set of components. The output signal from the first optical amplifier is transmitted to at least one middle component, and an input signal to the second optical amplifier is received from the at least one middle component.

The present invention also provides a chip-based IODA, which includes a first optical amplifier and a second optical amplifier. The first optical amplifier includes a first set of components and a shared set of components, the first set of components including a first length of Erbium-Doped Waveguide (EDW). The second optical amplifier includes a second set of components and the shared set of components, the second set of components including a second length of EDW.

The IODA and the two-stage amplifier allow more cost-effective and energy efficient use of single-channel amplifiers within optical communication systems. This is particularly advantageous in Dense Wavelength Division Multiplexing with a high channel count, as highly compact boosters and pre-amplifiers can be used with less power consumption while maintaining accurate power control.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
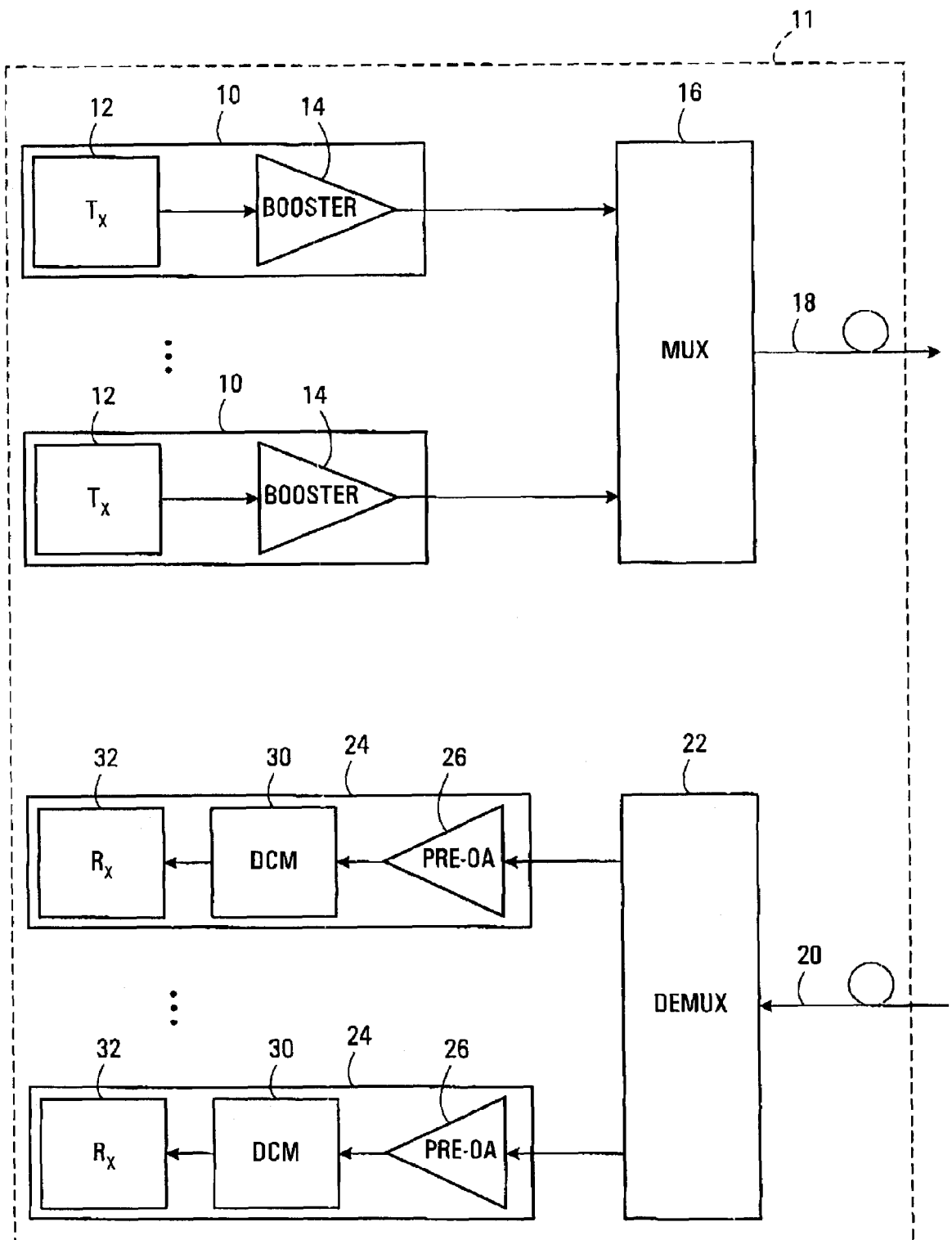
FIG. 1 is a block diagram of a portion of an optical communication system.

Referring to FIG. 1, a portion of an example optical communication system is shown. The optical communication system includes a transmission part and a reception part. The transmission part includes a plurality of transmission modules 10. Each transmission module 10 includes a transmitter 12 which transmits a transmitted signal. Each transmission module also includes a booster 14. The booster 14 is an optical amplifier which amplifies the transmitted signal to a desired signal strength. The transmitted signal from each transmission module passes to a multiplexer 16 which combines the plurality of transmitted signals into a single multiplexed transmitted signal, which is launched into a first optical fiber 18.

The reception part is responsible for receiving a plurality of received signals. A single multiplexed received signal arrives on a second optical fiber 20 (alternatively, the second optical fiber may be the same as the first optical fiber, in a bi-directional fiber communication system). A demultiplexer 22 separates the single multiplexed received signal into a plurality of received signals, passing each received signal to a corresponding reception module 24. Each reception module 24 includes a pre-amplifier 26 which amplifies the corresponding received signal to a desired signal strength. Each pre-amplifier 26 passes the corresponding received signal to a corresponding Dispersion Compensation Module (DCM) 30 within the reception module 24. Alternatively, the DCM 30 may be replaced by or combined with a Polarization Mode Dispersion Compensator (PMDC). Each DCM 30 passes the corresponding received signal to a corresponding receiver 32.

The portion of the communication system shown in FIG. 1 represents equipment at one end 11 of a fiber communication link. Similar arrangements of equipment would be located at the other end of the fiber communication link.

Figure 2:
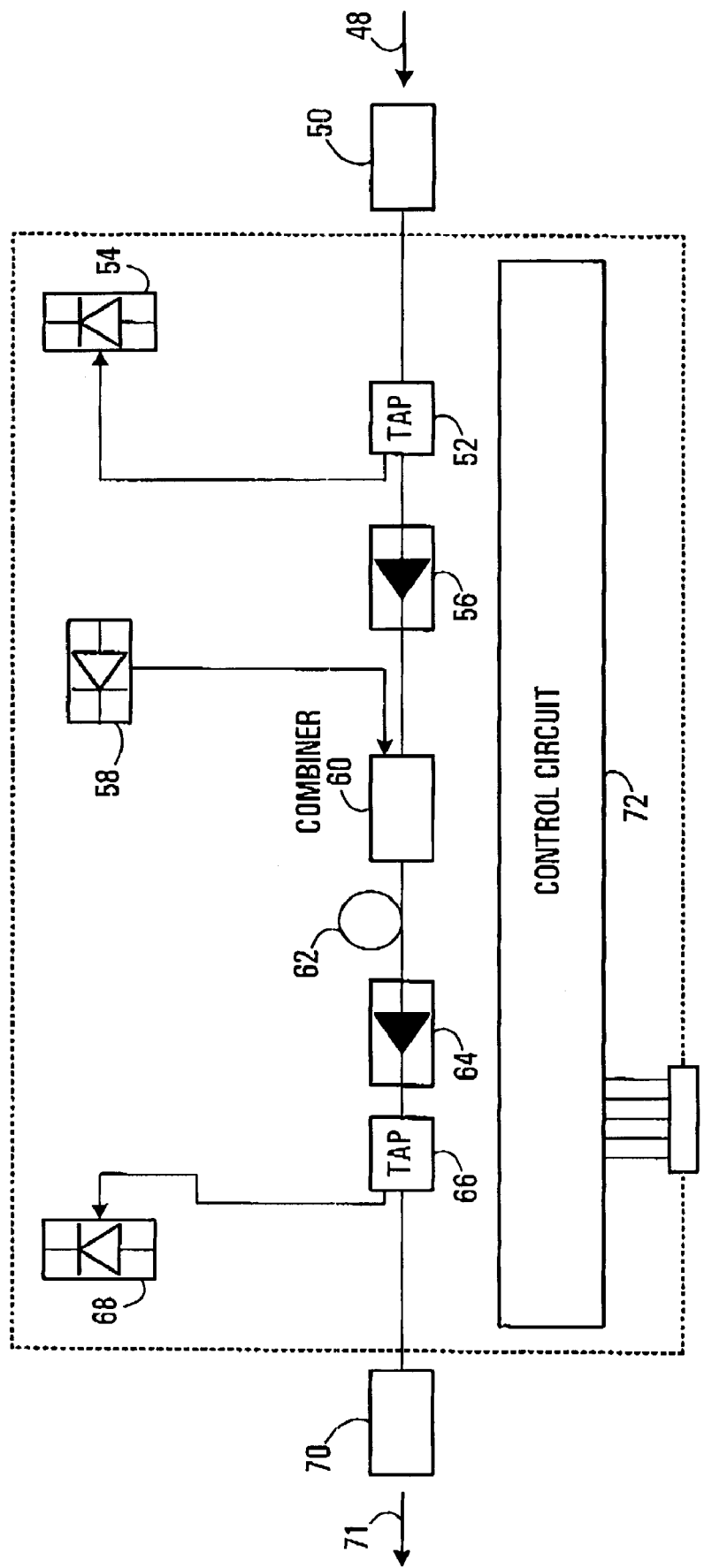
FIG. 2 is a block diagram of an optical amplifier of FIG. 1.

Referring to FIG. 2, a block diagram of a single optical amplifier (OA) is shown. An input signal 48 enters the OA at an input port 50 (the input signal 48, and all other signals described below, are optical signals). A first tap 52 diverts a small portion (for example, between 1% and 5%) of the input signal to a first photodetector 54. A main portion of the input signal passes through a first isolator 56. A pump laser 58 having an output power produces a pump light, which is combined with the main portion of the input signal at a combiner 60. The input signal is then amplified through stimulated emission iii a length of erbium doped fiber (EDF) 62 due to the pump light injected, to produce an amplified signal. The amplified signal passes through a second isolator 64 and on to a second tap 66, which diverts a small portion of the amplified signal to a second photodetector 68. A main portion of the amplified signal passes through an output port 70 as an output signal 71.

A control circuit 72 monitors a signal strength of the diverted portion of the amplified signal detected at the second photodetector 68. The control circuit 72 adjusts the output power of the pump laser 58 until the signal strength of the diverted portion of the amplified signal indicates that the main portion of the amplified signal is at a desired signal strength. The control circuit 72 also monitors a signal strength of the diverted portion of the input signal detected at the first photodetector 54 in order to determine an input power of the input signal 48. If the input power exceeds a minimum or a maximum value, the control circuit 72 turns off the pump laser 58.

In the optical communication system of FIG. 1, there is one booster for each transmitter 12 and one pre-amplifier for each receiver 32. Since there are an equal number of transmitters and receivers, each booster may be packaged with a pre-amplifier. Furthermore, the booster and the pre-amplifier may share one or more Components in order to form an integrated optical dual amplifier (IODA). The IODA includes a first optical amplifier (such as the pre-amplifier) having a first set of components, and a second optical amplifier (such as the booster) having a second set of components. The first optical amplifier and the second optical amplifier also both include a shared set of components, which may be optical components, electrical components, or opto-electrical components.

Figure 3:
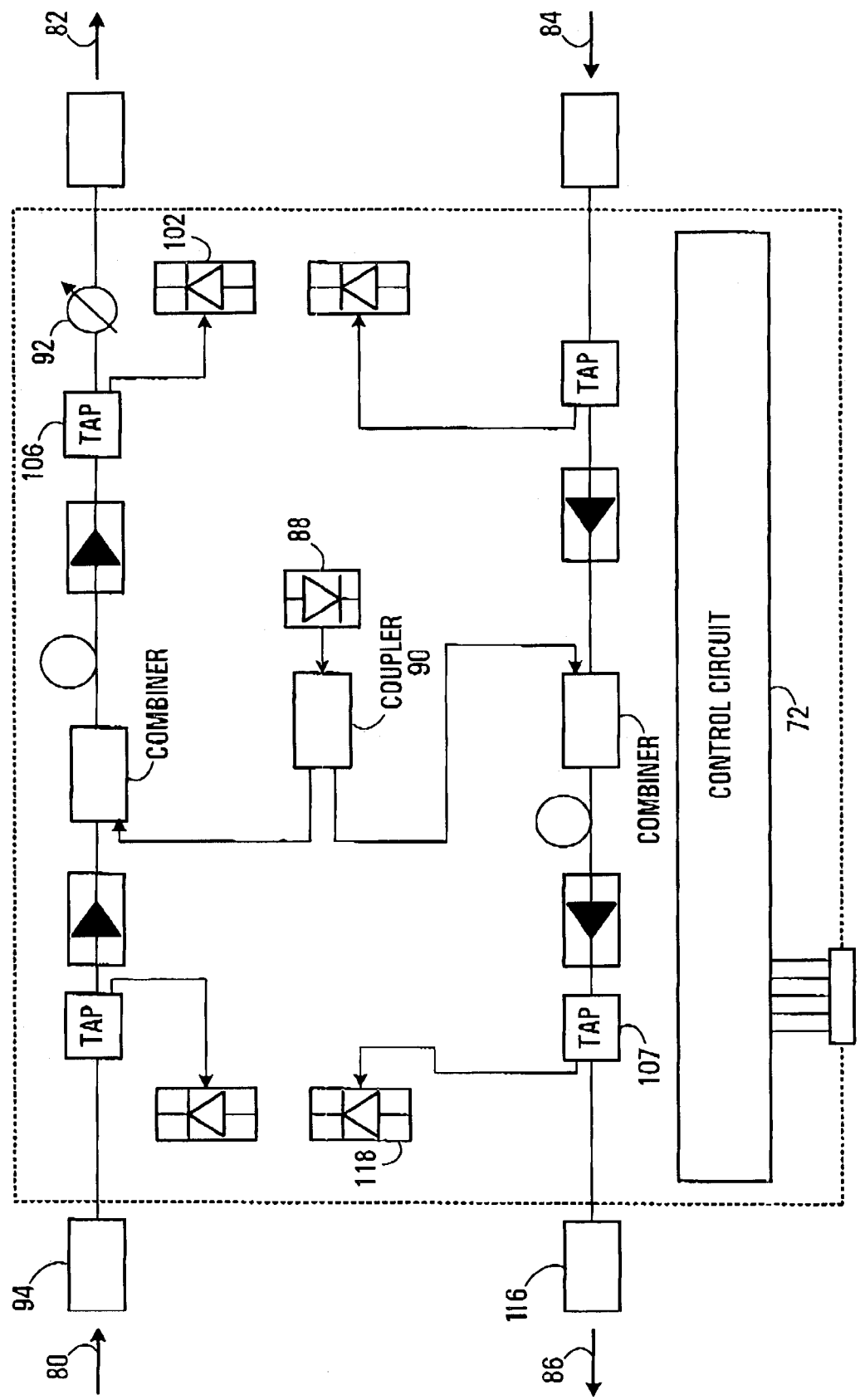
FIG. 3 is a block diagram of an integrated dual optical amplifier (IODA) according to one embodiment of the invention.

Referring to FIG. 3, an IODA according to one embodiment of the invention is shown. The IODA includes a first OA which receives a first input signal 80 and outputs a first output signal 82. The IODA also includes a second OA which receives a second input signal 84 and outputs a second output signal 86. The first input signal 80, the first output signal 82, the second input signal 84, and the second output signal 86 each have a signal strength. The first. OA and the second OA are similar to the optical amplifier shown in FIG. 2, except that they both share a pump laser 88. A coupler 90 is also provided to split the output power of the pump laser 88 in a coupling ratio so as to provide each of the optical amplifiers with a required share of the output power of the pump laser. In such an embodiment, the shared set of components includes the pump laser 88 and the coupler 90.

If the first OA is a pre-amplifier in a reception module and the second OA is a booster in a transmission module, then the first input signal 80 will arrive from a fiber, the first output signal 82 will be sent Lo a receiver, the second input signal 84 will arrive from a transmitter, and the second output signal 86 will be sent to a fiber. It may be desirable to maintain the signal strength of the first output signal 82 and the signal strength of the second output signal 86 at constant levels. The signal strength of the second (booster) input signal 84 will generally be constant, but the signal strength of the first (pre-amplifier) input signal 80 will usually vary. A variable optical attenuator (VOA) 92 is provided at the output of the first optical amplifier. The VOA 92 provides a variable attenuation to the first output signal 82. Alternatively, the VOA 92 may be placed immediately after the input port 94 of the first optical amplifier.

Figure 4:
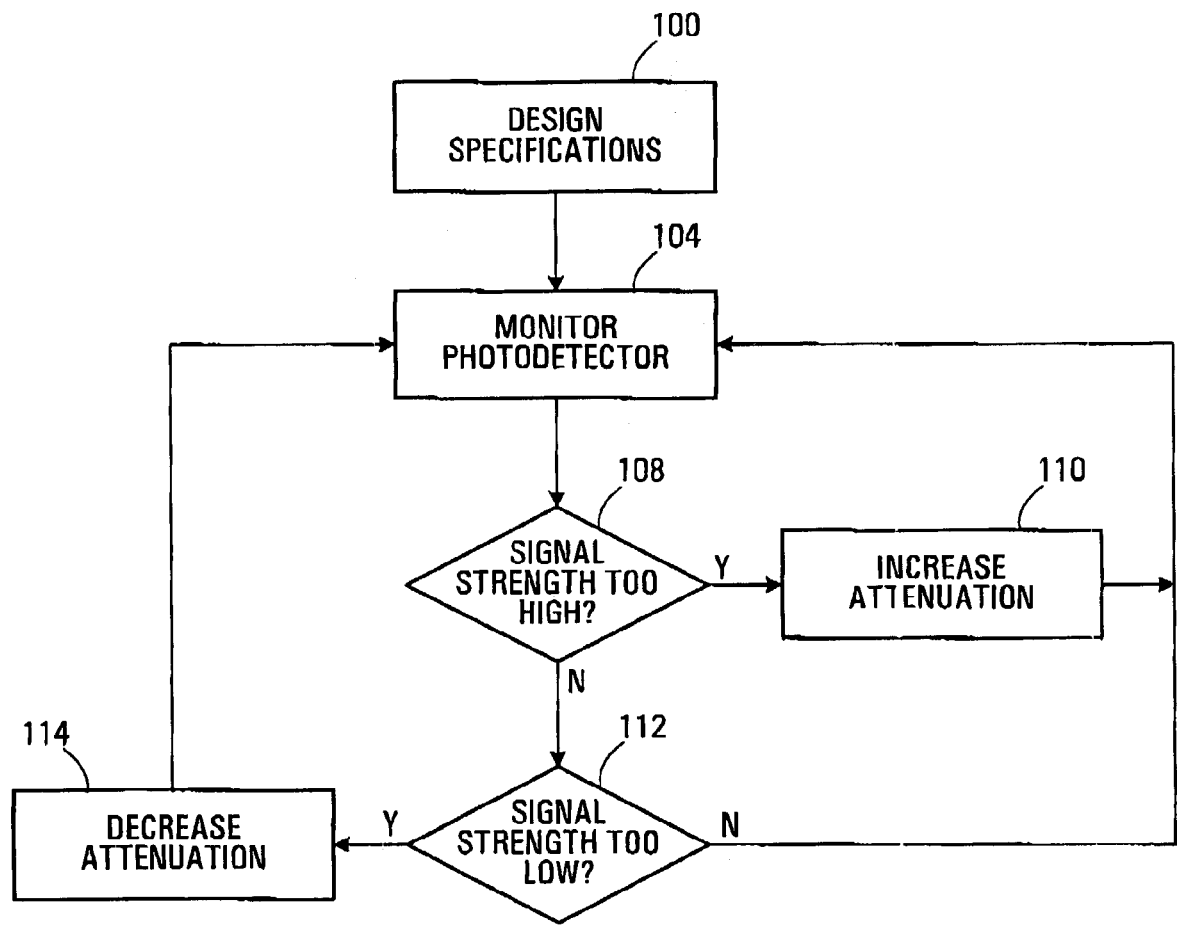
FIG. 4 is a flowchart of a method of controlling the signal strengths of the output signals of the IODA of FIG. 3.

Referring to FIG. 4, a method of controlling the power of the first output signal 82 is shown. At step 100 the output power of the pump laser 88 and the coupling ratio of the coupler 90 are designed so that the second (booster) output signal 86 has a desired power for a known signal strength of the second input signal 84 and for known losses and amplifications within the second optical amplifier. During operation of the IODA, the control circuit 72 monitors the second photodetector 102 of the first optical amplifier at step 104. Since the control circuit 72 knows how much of the signal is being diverted by the second tap 106, the signal strength of the diverted signal reaching the second photodetector is an indication of the signal strength of the first output signal 82. If the control circuit 72 determines at step 108 that the second photodetector 102 indicates that the signal strength of the first output signal 82 is higher than a desired signal strength, then at step 110 the control circuit 72 increases the attenuation of the VOA 92. If the control circuit 72 determines at step 112 that the second photodetector 102 indicates that the signal strength of the first output signal 82 is lower than the desired signal strength, then at step 111 the control circuit 72 decreases the attenuation of the VOA 92.

Alternatively, the VOA 92 may be located immediately before the tap 107 of the second optical amplifier However, the control circuit 72 must then be able to adjust the output power of the pump laser 88 while monitoring the second photodetector 102 of the first optical amplifier, as the output power of the pump laser 88 is the only means of adjusting the signal strength of the first output signal in such an embodiment. As the control circuit 72 adjusts the output power of the pump laser 88, the control circuit 72 adjusts the attenuation in the VOA 92 while monitoring the second photodetector 118 in the second optical amplifier, in order to ensure the signal strength of the second output signal 86 is at a desired level.

Generally, in this and other embodiments, the control circuit 72 controls the signal strength of the output signals by monitoring one or more photodetectors and adjusting one or more components within the optical amplifiers, possibly including one or more of the components within the shared set of components. The control circuit 72 may comprise circuitry, including microprocessor circuitry, or processing instructions in computer memory.

Figure 5:
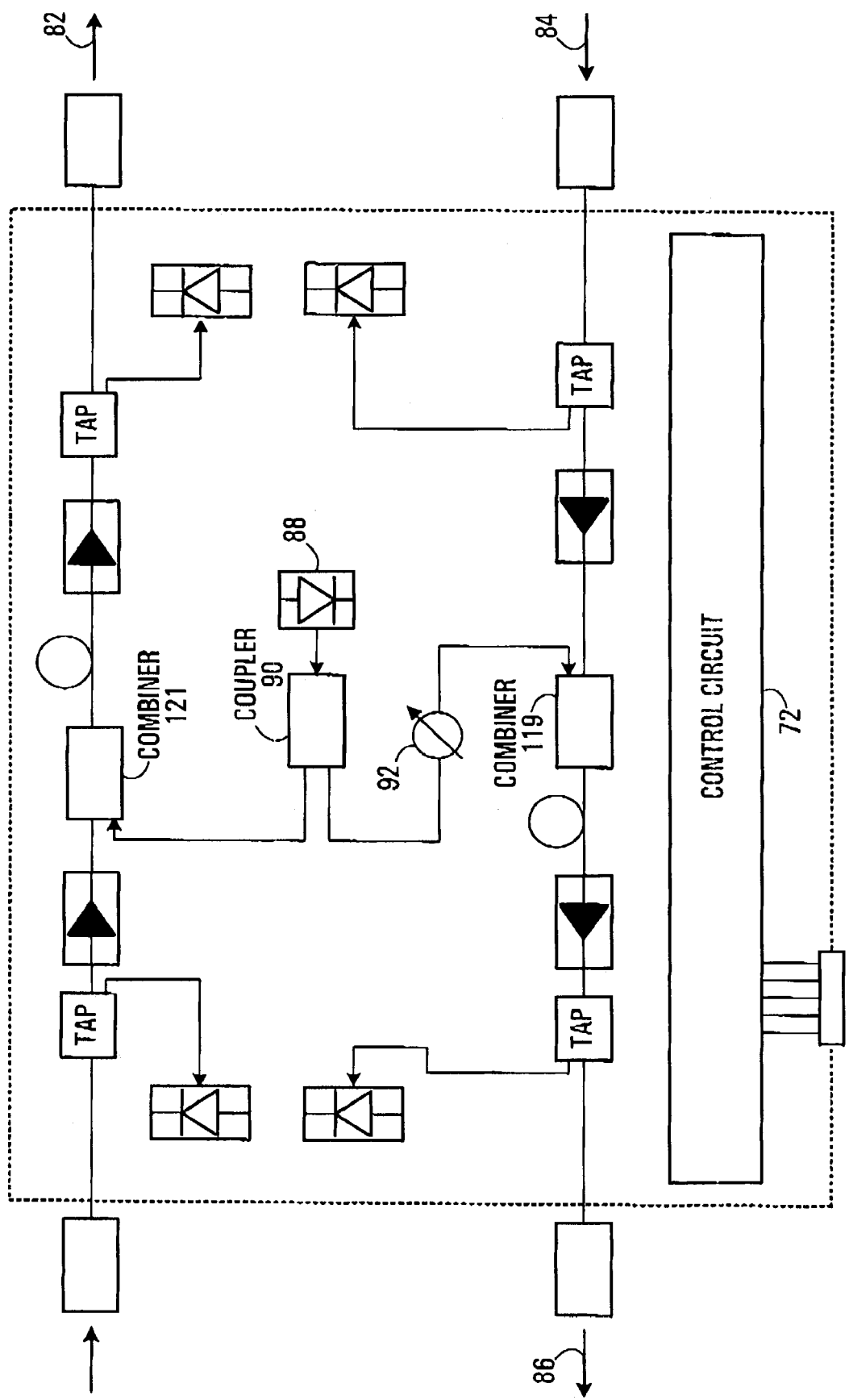
FIG. 5 is a block diagram of an IODA according to another embodiment of the invention.

Referring to FIG. 5, an IODA according to an alternative embodiment of the invention is shown. The IODA shown in FIG. 5 is similar to the IODA shown in FIG. 3, the first optical amplifier and the second optical amplifier sharing a pump laser 88 and a coupler 90. However, the VOA 92 is located between the coupler 90 and the combiner 119 of the second (booster) optical amplifier The output power of the pump laser 88 is adjusted by the control circuit 72 in order to obtain the desired signal strength of the first output signal 82, and the attenuation of the VOA 92 is adjusted by the control circuit 72 in order to obtain the desired signal strength of the second output signal 86. Alternatively, the VOA 92 may be located between the coupler 90 and the combiner 121 of the first optical amplifier, in which case the output power of the pump laser 88 is designed to provide the desired signal strength of the second output signal 86 (since, in the case of a booster at a transmission module, the power of the second input signal 84 is constant), and the attenuation of the VOA 92 is adjusted by the control circuit 72 in order to obtain the desired signal strength of the first output signal 82.

Figure 6:
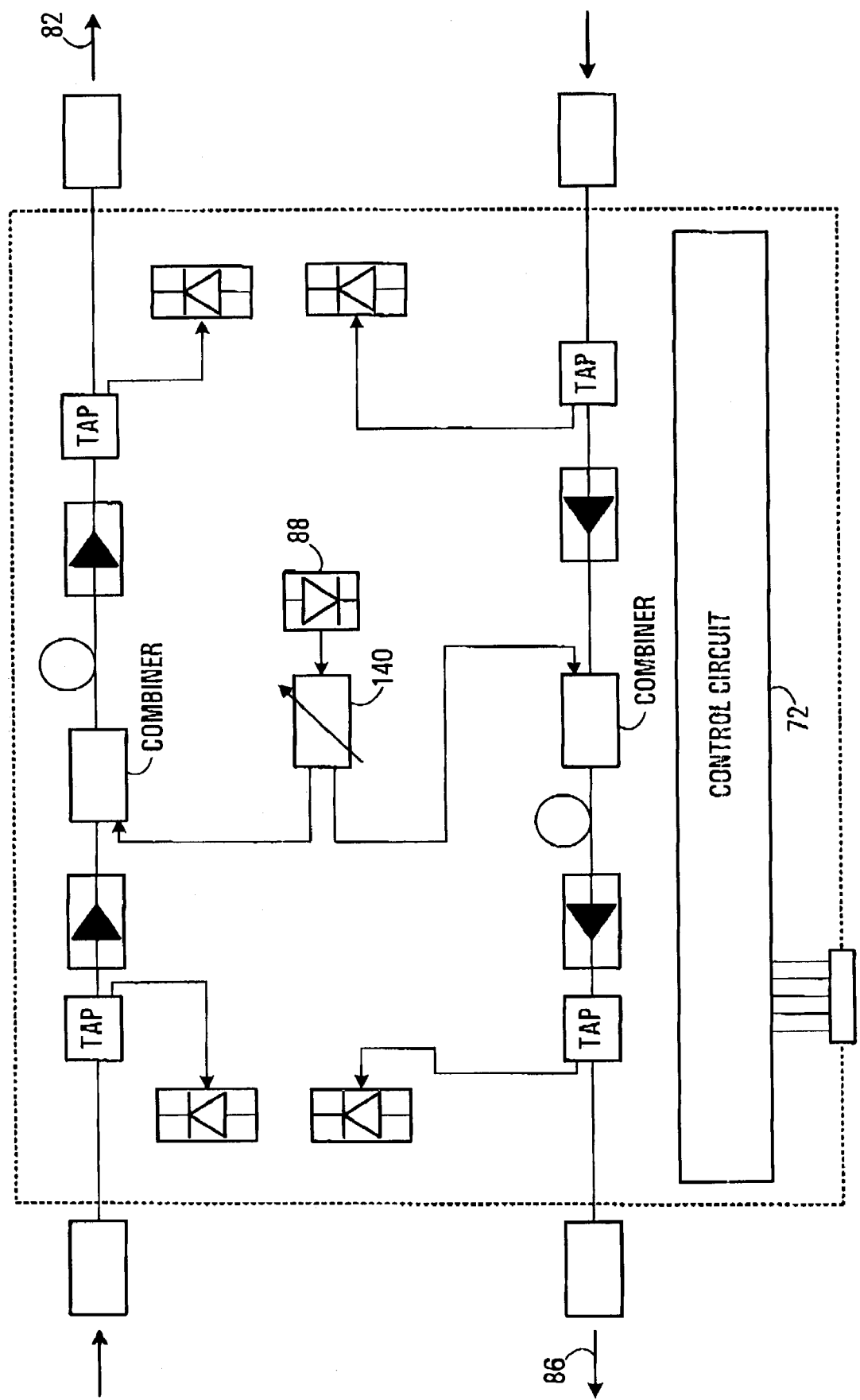
FIG. 6 is a block diagram of an IODA according to yet another embodiment of the invention.

Referring to FIG. 6, an IODA according to yet another embodiment of the invention is shown. In this embodiment, the shared set of components includes the pump laser 88 and a variable coupling ratio coupler 140. The control circuit 72 adjusts the output power of the pump laser 88 and the coupling ratio of the variable coupling ratio coupler 140 in order to obtain the desired signal strengths of the first output signal 82 and of the second output signal 86.

Figure 7:
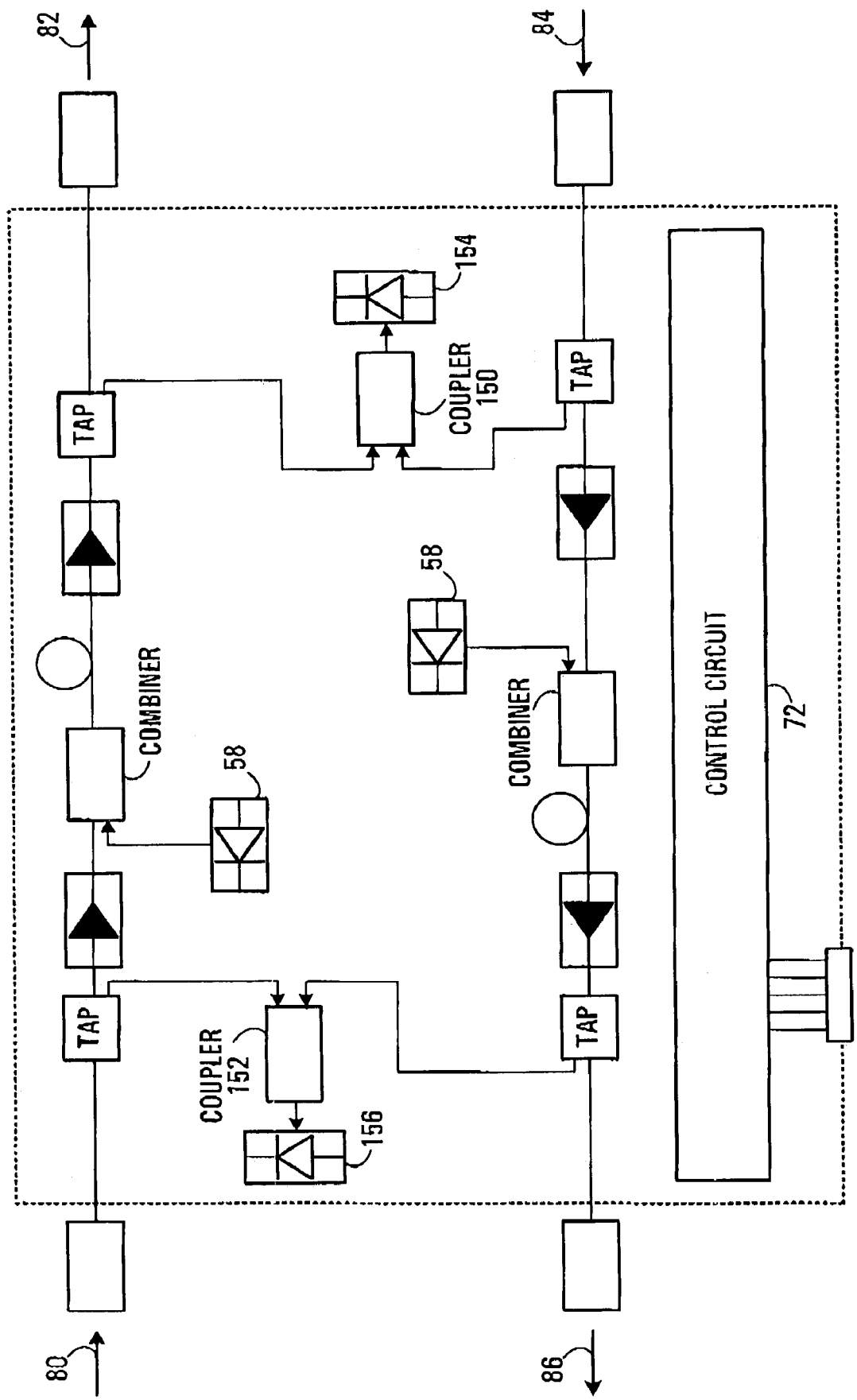
FIG. 7 is a block diagram of an IODA according to yet another embodiment of the invention.

Referring to FIG. 7, an IODA according to yet another embodiment of the invention is shown. In this embodiment, the shared set of components include a first coupler 150, a second coupler 152, a first photodetector 154, and a second photodetector 156. The first coupler 150 combines a diverted portion of the first output signal 82 with a diverted portion of the second input signal 84, and feeds the combined signal to the first photodetector 154. Similarly, the second coupler 152 combines a diverted portion of the first input signal 80 with a diverted portion of the second output signal 86, and feeds the combined signal to the second photodetector 156. If a first dither is included in the first input signal 80 and a second dither, having a different frequency or code from the first dither, is included in the second input signal 84, then digital signal processing techniques can be used to distinguish the two dithers at each photodetector 154 and 156. This allows the control circuit 72 to determine the signal strength of each of the first output signal 82 and the second output signal 86, and to adjust the output power of each pump laser 58 accordingly. Of course if the signal strength of the input signal to the second optical amplifier is constant, then only a first dither is needed as only the pump laser 58 of the first optical amplifier will need to be adjusted to maintain the signal strength of the output signal of the first optical amplifier at a constant signal strength.

Figure 8:
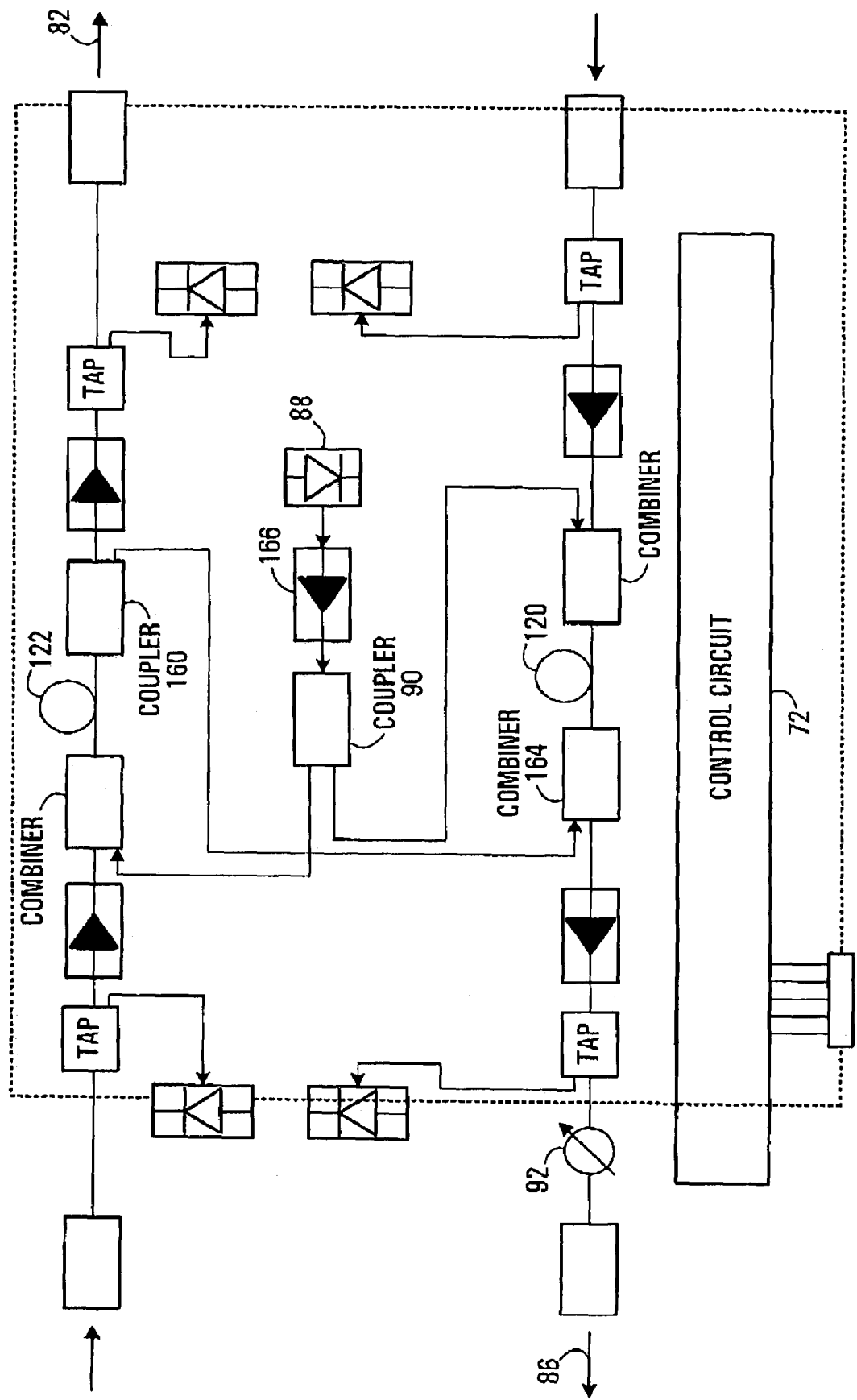
FIG. 8 is a block diagram of an IODA according to yet another embodiment of the invention.

Referring to FIG. 8, an IODA according to yet another embodiment of the invention is shown. As in the embodiment described above with reference to FIG. 3, the shared set of components includes a pump laser 88 and a coupler 90, and one of the optical amplifiers includes a VOA 92 for control purposes. However, the first optical amplifier also includes a second coupler 160, which diverts a remaining portion of the pump power from the EDF 122 of the first optical amplifier for re-use in the second optical amplifier. The remaining portion of the pump power is passed along an optical path 162 to a third combiner 164, which feeds the remaining portion of the pump power to the EDF 120 of the second optical amplifier. The shared set of components also includes a pump isolator 166 to prevent the remaining portion of the pump power from interfering with the pump laser 88.

Figure 9:
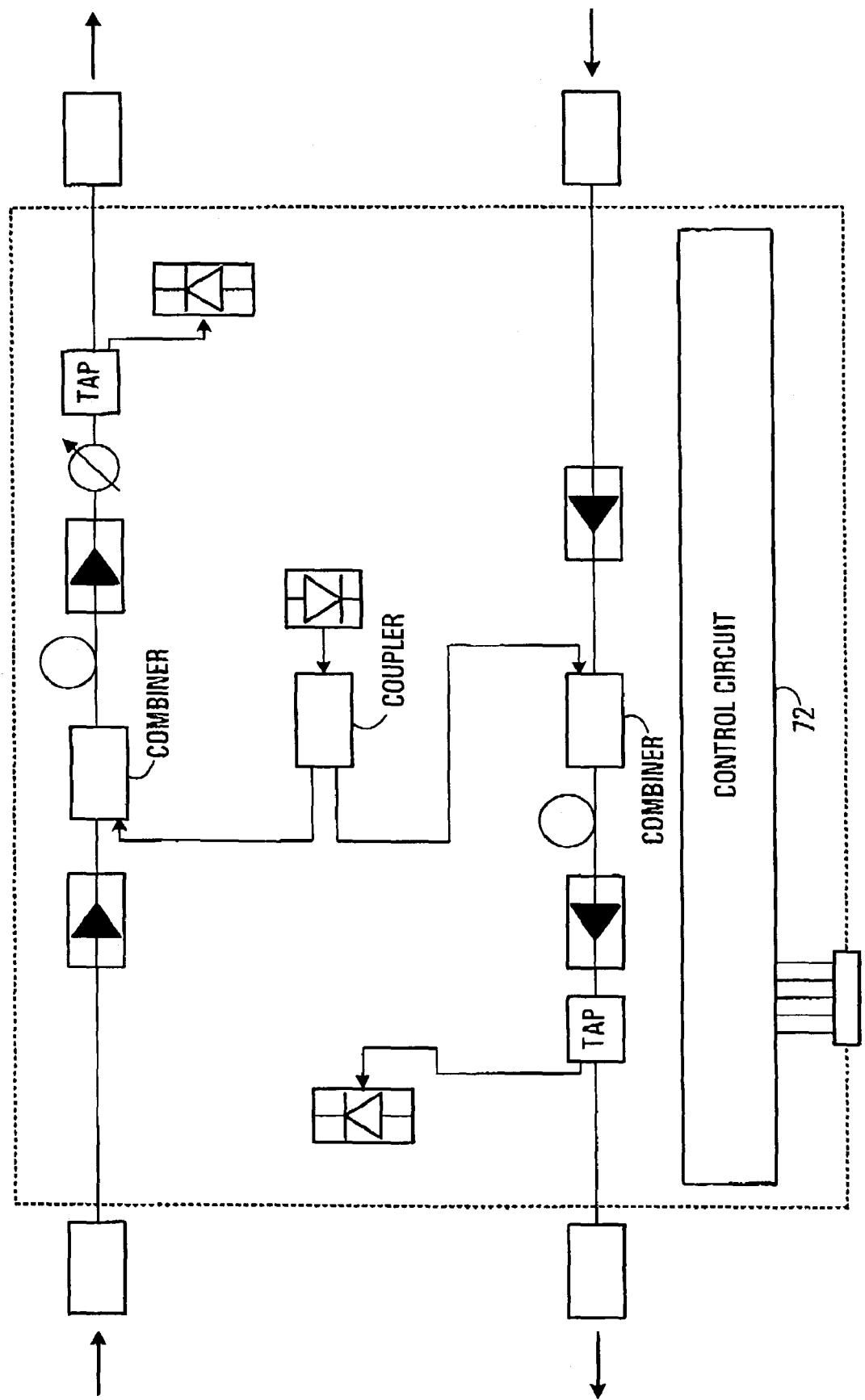
FIG. 9 is a block diagram of an IODA according to yet another embodiment of the invention.

Referring to FIG. 9, an IODA according to yet another embodiment of the invention is shown. The IODA shown in FIG. 9 is similar to the IODA described above with reference to FIG. 3, except that each optical amplifier includes only one tap and one photodetector.

Figure 10:
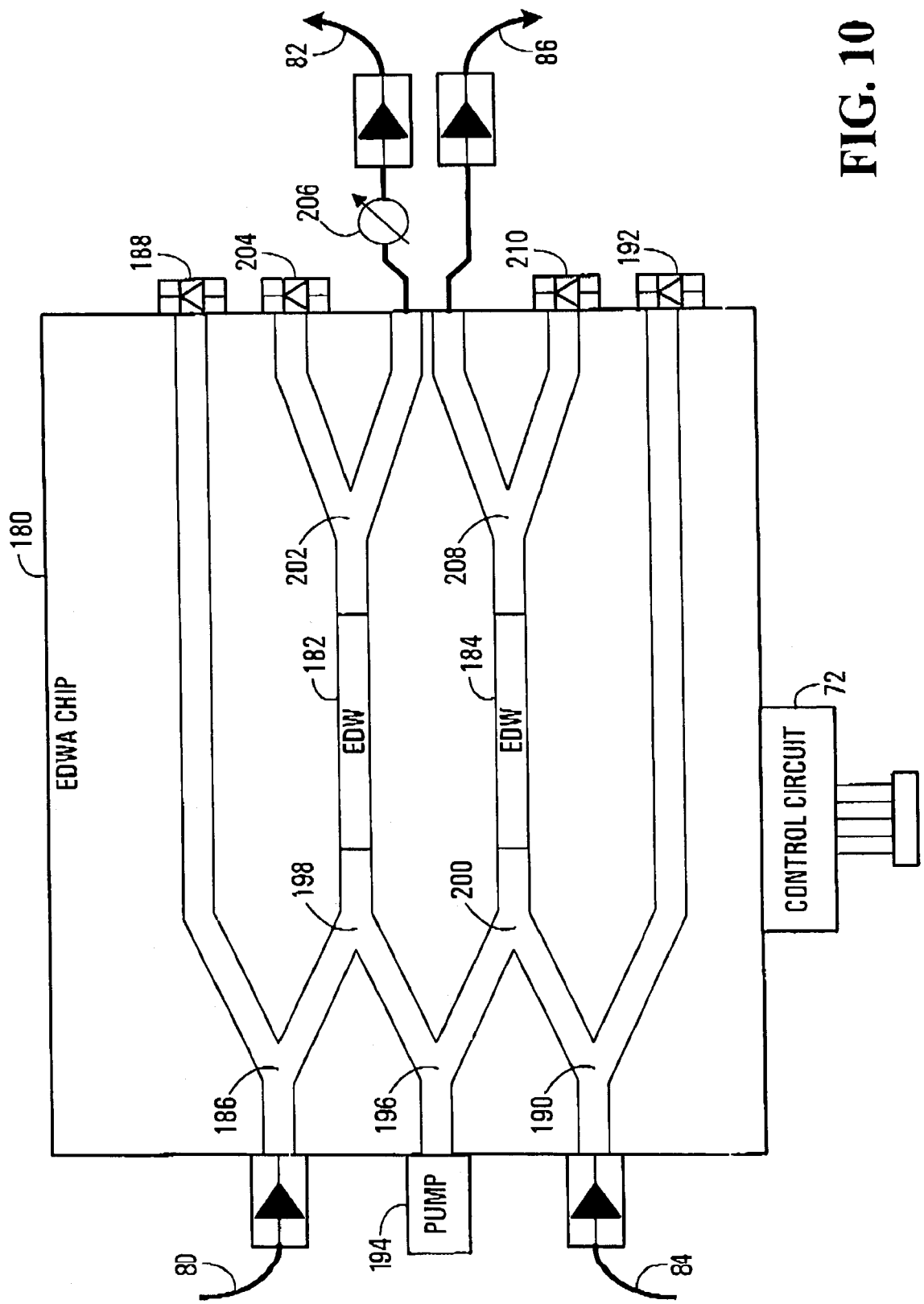
FIG. 10 is a diagram of a chip-based IODA according to one embodiment of the invention.

The IODA has been described using EDF to amplify the optical signals. The IODA may also be implemented on a chip, using Erbium-Doped Waveguides (EDWs) to amplify the optical signals. Using the same principle as in the EDF amplifiers described above, two amplifiers may be implemented on the chip, the amplifiers being integrated so as to share one or more components. Referring to FIG. 10, a chip-based IODA according to one embodiment of the invention is shown. The chip-based IODA receives a first input signal 80 and a second input signal 84, and outputs a first output signal 82 and a second output signal 86. The chip-based IODA includes an Erbium-Doped Waveguide Amplifier chip 180, and discrete components such as a pump laser 194, photodiodes 188, 192, 204, and 206, isolators, and a VOA 206. Amplification in the first amplifier is effected by a first length of EDW 182 and amplification in the second amplifier is effected by a second length of EDW 184. A first tap 186 diverts a portion of the first input signal along a waveguide to the photodetector 188, and a second tap 190 diverts a portion of the second input signal along a waveguide to the photodetector 192, so that the control circuit 72 can monitor for power levels of the incoming signals 80 and 84.

The pump laser 194 has a pump power and provides a pump light, which is split by a splitter 196. A first part of the pump light is combined with the main portion of the first input signal at a first: combiner 198, and a second part of the pump light is combined with the main portion of the second input signal at a second combiner 200. The first input signal passes through the first length of EDW 182, where At is amplified by reason of the first part of the pump light to produce a first amplified signal. A tap 202 diverts a portion of the first amplified signal to the photodetector 204 for control purposes. A remaining portion of the first amplified signal passes through the VOA 206 (which may be incorporated into the waveguide), and is then output as the first output signal.

Similarly, the second input signal passes through the second length of EDW 184, where it is amplified by reason of the second part of the pump light to produce a second amplified signal. A tap 208 diverts a portion of the second amplified signal to the photodetector 210 for control purposes. A remaining portion of the second amplified signal is output as the second output signal.

The control circuit 72 controls the signal strength of the first output signal 82 and of the second output signal 86 by adjusting the attenuation of the VOA 206 and by adjusting the output power of the pump laser 194 while monitoring the signal strengths detected at the photodetectors 204 and 210, as described above with respect to the IODA of FIG. 3.

The chip-based IODA of FIG. 10 is analogous to the IODA of FIG. 3, in theft the shared components include a pump laser and a device for delivering pump light to both amplifiers (the coupler 90 in the IODA of FIG. 3, and the splitter 196 in the chip-based IODA of FIG. 10). Similarly, configurations of other IODAs can be adapted to implemented as chip-based IODAs. As in the configurations of IODA described with reference to FIG. 3 to 9, the chip-based IODAs can be viewed as a first optical amplifier having a first set of components (one of which is a length of EDW), a second optical amplifier having a second set of components (one of which is another length of EDW), the two optical amplifiers also sharing a shared set of components. In the chip-based IODA of FIG. 10, the shared set of components include the pump laser 194 and the splitter 196.

The invention has been described with respect to use of the dual optical amplifier as an integrated booster and pre-amplifier within an optical communication system, the booster receiving an input transmission signal from a transmitter and the pre-amplifier receiving an input received signal from an optical link. More generally, the dual optical amplifier of the invention may be used in any application where it is desirable to share components between two optical amplifiers. For example, the dual optical amplifier may be used as a two-stage amplifier spanning at least one middle component. The output signal from the first OA is passed to the at least one middle component, and the input signal to the second OA is received from the at least one middle component. At a receiver in an optical communication system, the at least one middle component may include a dispersion compensation module or a polarization mode dispersion compensator.

What has been described is merely illustrative of the application of the principles of the invention. Other arrangements and methods can be implemented by those skilled in the art without departing from the spirit and scope of the present invention.

We claim:

1. An apparatus comprising:
    an integrated optical dual amplifier (IODA), including:
        a first optical amplifier including a first set of components and a shared set of components, where the shared set of components includes at least a pump laser, the first optical amplifier operable to amplify a transmit optical signal;
        a second optical amplifier including a second set of components and the shared set of components, the second optical amplifier operable to amplify a receive optical signal, the receive optical signal being distinct from the transmit optical signal;
        a coupler coupling the pump laser to each of the first optical amplifier and the second optical amplifier;
        a variable optical attenuator positioned between the coupler and one of the optical amplifiers; and
        a controller configured to monitor a first signal strength of the transmit optical signal and a second signal strength of the receive optical signal and to control an output of the pump laser to adjust an output optical signal of at least one of the first and second optical amplifiers using monitored values of the first signal strength and the second signal strength.

2. The apparatus of claim 1, further comprising:
    a transmitter coupled to an input of the first amplifier, the transmitter configured to provide the transmit optical signal; and
    a receiver coupled to an output of the second amplifier, the receiver configured to receive an amplified receive optical signal.

3. The IODA of claim 1, where the first amplifier includes one or more first photodetectors, each first photodetector configured to detect a strength of the transmit optical signal and the second amplifier includes one or more second photodetectors, each second photodetector configured to detect a strength of the receive optical signal.

4. The IODA of claim 1 wherein the variable optical attenuator has an attenuation and is located between the coupler and the second optical amplifier, the IODA further comprising:
    means for determining a signal strength of a first output signal transmitted from the first optical amplifier;
    means for determining a signal strength of a second output signal transmitted from the second optical amplifier;
    means for adjusting an output power of the pump laser until the signal strength of the first output signal is at a first desired signal strength; and
    means for adjusting the attenuation until the signal strength of the second output signal is at a second desired signal strength.

5. The IODA of claim 4 wherein the means for determining the signal strength of the first output signal comprise means for detecting a signal strength of a diverted portion of the first output signal at a first photodetector, and wherein the means for determining the signal strength of the second output signal comprise means for detecting a signal strength of a diverted portion of the second output signal at a second photodetector.

6. An apparatus comprising:
    an integrated optical dual amplifier (IODA) including:
        a first optical amplifier including a first set of components, the first optical amplifier operable to amplify a transmit optical signal;
        a second optical amplifier including a second set of components, the second optical amplifier operable to amplify a receive optical signal, the receive optical signal being distinct from the transmit optical signal;
        a shared pump laser; and a coupler coupling the shared pump laser to each of the first optical amplifier and the second optical amplifier; and a controller configured to monitor a first signal strength of the transmit optical signal and a second signal strength of the receive optical signal and to control an output of the pump laser to adjust an output optical signal of at least one of the first and second optical amplifiers using monitored values of the first and second signal strengths.

7. The apparatus of claim 6, further comprising:

a variable optical attenuator configured to adjust a pump signal from the pump laser to one of the first and second amplifiers.

8. An apparatus comprising:

an integrated optical dual amplifier (IODA) including:
- a first optical amplifier operable to amplify a first received input optical signal received from a transmitter;
- a second optical amplifier operable to amplify a second received input optical signal for output to a receiver;
- a shared pump laser;
- a coupler coupling the shared pump laser to each of the first optical amplifier and the second optical amplifier; and
- a controller configured to monitor a first signal strength of the first optical signal and a second signal strength of the second optical signal and to control an output of the pump laser to adjust an output optical signal of at least one of the first and second optical amplifiers, using a value of one or more of the first signal strength and the second signal strength.

9. A dual optical communication module comprising:

a transmission module comprising a transmitter and a booster amplifier, wherein the booster amplifier includes a first set of components and a shared set of components, and the shared set of components includes at least a pump laser;

a reception module comprising a receiver and a pre-amplifier, wherein the pre-amplifier includes a second set of components and the shared set of components;

a coupler coupling the pump laser to the booster and the pre-amplifier; and a variable optical attenuator positioned between the coupler and either the booster or the pre-amplifier; and a controller configured to monitor a first signal strength of a first optical signal of the transmission module and a second signal strength of a second optical signal of the reception module and to control an output of the pump laser based on monitored values of the first and second signal strengths to adjust an output optical signal of at least one of the transmission module and the reception module.

10. A method comprising:

monitoring a first signal strength of a first optical signal in a first amplifier;

monitoring a second signal strength of a second optical signal in a second amplifier, the first optical signal being distinct from the second optical signal; and adjusting an output power of a pump laser to adjust an output optical signal of at least one of the first amplifier and the second amplifier using monitored values of the first signal strength and the second signal strength.

\* \* \* \* \*